United States Patent [19]

Ljung et al.

[11] Patent Number: 4,865,452

[45] Date of Patent: Sep. 12, 1989

[54] BEAM COMBINER ASSEMBLY FOR RING LASER GYROSCOPE

[75] Inventors: Bo H. G. Ljung, Wayne; John C. Stiles, Morris Plains, both of N.J.

[73] Assignee: Kearfott Guidance and Navigation Corporation, Wayne, N.J.

[21] Appl. No.: 238,663

[22] Filed: Aug. 31, 1988

[51] Int. Cl.$^4$ .............................................. G01B 9/02
[52] U.S. Cl. ................................... 356/354; 356/350; 356/162.17
[58] Field of Search ..................... 356/354, 350, 162.17

[56] References Cited

U.S. PATENT DOCUMENTS

| | | |
|---|---|---|
| 34,377 | 4/1987 | Ljung . |
| 4,477,188 | 10/1984 | Stiles et al. . |
| 4,677,641 | 6/1987 | Dodgorsky ............................ 373/94 |
| 4,783,170 | 11/1988 | Bergstrom ............................ 356/350 |

OTHER PUBLICATIONS

Journal of Optical Society of America, vol. 73, No. 9, pp. 1113to 1118, Sept. 1983, "High-Frequency Holographic Transmission Gratings in Photoresist" by R. C. Enger and S. K. Case.
Journal of Applied Optics, vol. 23, No. 14, pp. 2302 to 2310, July 15, 1984, "Dielectric Surface—Relief Gratings with High Diffraction Efficiency" by Kyoshi Yokomori.
Journal of Applied Optics, vol. 23, No. 18, pp. 3214 to 3220, Sept. 15, 1985, "Diffraction Characteristic of Photoresist Surface—Relief Gratings" by M. G. Moharam, T. K. Gaylord, G. T. Sincerbox, H. Werlich and B. Yung.

*Primary Examiner*—Léon Scott Jr.
*Attorney, Agent, or Firm*—Pollock, VandeSande & Priddy

[57] ABSTRACT

A beam combiner assembly for a ring laser gyroscope is fabricated by positioning two diffraction gratings, mounted onto respective light transmissive substrates, with respect to the output mirror of the gyro block at an offset angle such that an interference fringe pattern is projected onto the photodetector of the ring laser gyroscope. By tilting the diffraction gratings, with respect to the plane of the output mirror, a corrected number of lines per unit length for the diffraction gratings may be effected, thereby providing a beam combiner assembly which is compensated for manufacturing imperfections and other intolerances. Also, the high sensitivity of angular adjustments for the conventional prism beam combiner is overcome.

20 Claims, 4 Drawing Sheets

BEAM COMBINER ASSEMBLY FOR RING LASER GYROSCOPE

FIELD OF THE INVENTION

The present invention relates to gyroscopes and more particularly to a new type of beam combiner assembly for a ring laser gyroscope.

Background of the Invention

As is well known, beam combiners associated with respective mirrors mounted at appropriate apexes of a ring laser gyro block are used to generate interference fringe patterns, one for each axis of a three axis ring laser gyroscope. By measuring the respective interference fringe patterns, the inertial orientation of the gyroscope, therefore by extension the vehicle to which the gyroscope is mounted, can be ascertained. Such a ring laser gyroscope is fully disclosed in the inventors' U.S. Pat. No. 4,477,188.

Moreover, in co-pending U.S. patent application Ser. No. 034,377, assigned to the same assignee as the instant invention and having as its inventor one of the co-inventors of the instant application, it was pointed out that beam combiners conventionally are made up of a single prismatic block of light transmissive material having a number of facets thereon for reflecting and combining light beams exiting from the cavity of the ring laser gyroscope.

Operationwise, these prism beam combiners work well. However, since each prism beam combiner has a number of facets, in order to obtain the correct amount of reflection and refraction properties therefor, each of the facets has to be polished very carefully and accurately. Putting it differently, very precise angular tolerances and flatness of the optical facets are required during the manufacturing of the prismatic beam combiners. Naturally, such precision manufacturing is expensive. So, too, the angular adjustment for these prismatic beam combiners is quite sensitive and difficult to maintain.

SUMMARY OF THE PRESENT INVENTION

The present invention beam combiner assembly departs completely from the concept of using prisms for beam combiners. Instead, the present invention beam combiner assembly uses diffraction gratings for converging and diverging the circulating light beams of a ring laser gyroscope such that an interference fringe pattern, heretofore generated by a prismatic beam combiner, may be generated and provided to a typical photodiode detector.

In essence, the present invention beam combiner assembly has a first diffraction grating for receiving the light beams transmitted from the cavity of the ring laser gyroscope through an output mirror. This first diffraction grating is offset from the plane of the output mirror at an angle such that the diffracted beams are converged onto approximately the same point of a second diffraction grating, which has been positioned in spatial relationship to the first diffraction grating. The second diffraction grating then diverges the converged beams slightly, enough so that, upon impingement onto the photodiode detector, these divergent beams form an interference fringe pattern thereon to provide information concerning the angular rotation to which the ring laser gyroscope is being subjected.

The respective diffraction gratings are mounted onto corresponding light transmissive substrates, which are bonded together in such a way that the diffraction gratings are mounted onto opposite surfaces of the bonded substrates. This combination grating/substrate assembly is then coupled, by adhesive bonding or otherwise, to the photodiode detector, with the convergent diffraction grating being positioned to face away from the detector. To maintain the offset angle between the convergent diffraction grating and the plane of the output mirror, the thus bonded combination assembly of gratings, substrates and detector may be adhesively fixed to a circular casing mounted to the output mirror. The offset angle is adjusted so as to eliminate any manufacturing imperfections which may occur with respect to the diffraction gratings.

Inasmuch as the diffraction gratings may be batch processed, the cost for fabricating the instant invention beam combiner assembly is much lower than that of fabricating a prismatic beam combiner. Moreover, lower assembly costs are achieved compared to prior art prismatic beam combiners since the angle for offsetting the diffraction gratings to the plane of the output mirror needs to be adjusted with much less precision than the prior art prismatic beam combiners.

It is, therefore, an objective of the present invention to fabricate a beam combiner assembly, using diffraction gratings, which costs less to manufacture than the prior art prismatic beam combiners.

It is yet another objective of the present invention to provide a beam combiner assembly that can compensate for imprecisely fabricated diffraction gratings.

BRIEF DESCRIPTION OF THE FIGURES

The above-mentioned objects and advantages of the present invention will become more apparent and the invention itself will be best understood by reference to the following description of the invention taking in conjunction with the accompanying drawings, wherein.

DETAILED DESCRIPTION OF THE PRESENT INVENTION

Figure 1:
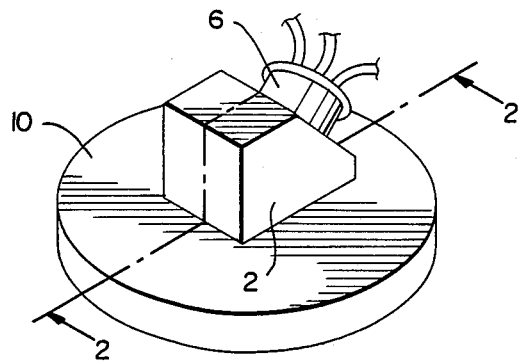
FIG. 1 is a perspective view of a prior art prismatic beam combiner assembly.

A prior art beam combiner assembly for a ring laser gyroscope is shown perspectively in FIG. 1. Such assembly includes the following essential components: a prism 2, a ring laser gyroscope output mirror 10 and a dual photodetector 4 (See FIG. 2) enclosed in a housing 6.

Figure 2:
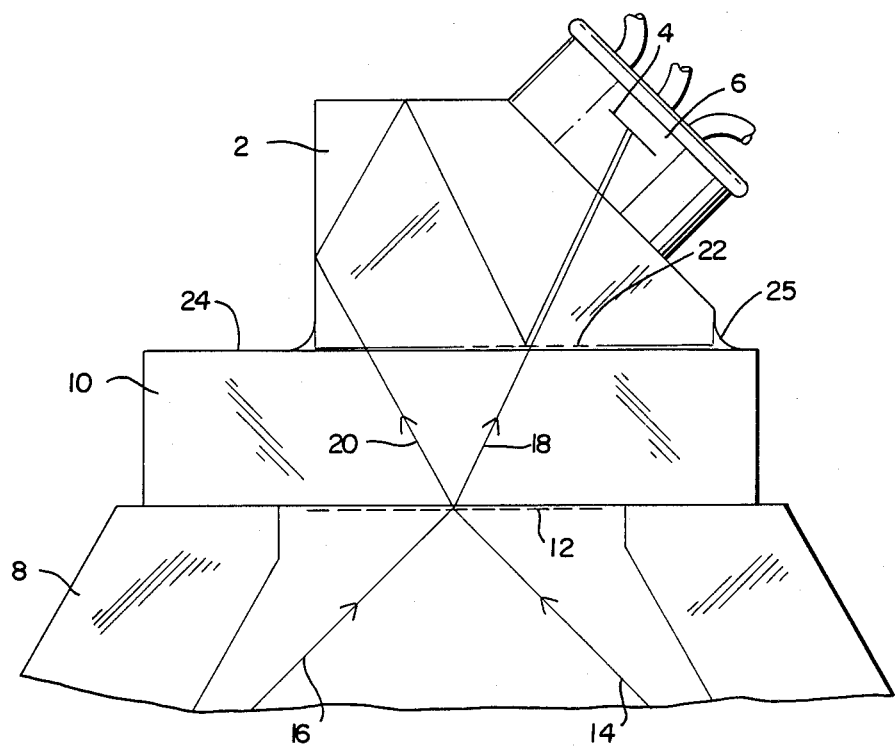
FIG. 2 is a cross-sectional view of the FIG. 1 beam combiner assembly taken along the line 2—2.

FIG. 2 shows a cross-sectional view, taken along line 2—2, of the prior art FIG. 1 prismatic beam combiner. As shown, prism 2 is utilized in the prior art beam combiner to reflect light beams toward dual photodetector 4, encased in housing 6. Onto gyro block 8 is fastened ring laser gyro output mirror 10, which has a reflective coating 12 for reflecting most of the incident light beams 14 and 16. For the FIG. 2 embodiment, beam 14 may be considered as rotating in the counterclockwise direction and beam 16 in the clockwise direction. The clockwise rotating light beam 16 that leaks through reflective coating 12 as beam 18 is transmitted through the half transmissive coating 22, which is attached to prism 2, and then is allowed to strike dual photodetector 4. The portion of the light beam that leaks through reflective coating 12 and designated as 20, on the other hand, is reflected twice in prism 2, which is usually made reflective by means of a metallic coating of silver or aluminum. As illustrated, beam 20 is reflected by coating 22, before striking dual photodetector 4. Thus, beam 18 is largely unaffected by the alignment of prism 2, whereas beam 20 is.

A sideways adjustment of prism 2 in the plane of FIG. 2 causes beams 18 and 20 to strike photodetector 4 at a coincident point. An angular adjustment of prism 2, meanwhile, forms a small wedge angle between surface 24 and reflective coating 22, i.e. the bottom surface of prism 2. This small wedge angle in turn effects a small angle of convergence (or divergence) between beams 18 and 20, incident on dual photodetector 4. Ordinarily, the small angle between the two beams is chosen to be approximately 100 seconds of arc, the separation needed in order to form a suitable spacing between the well documented interference fringes for a ring laser gyroscope. For the FIG. 2 prior art embodiment, it is possible to secure prism 2 in the preselected position by means of an adhesive 25. As is well known in the industry, the cost for fabricating prism 2, due to its strict dimensional and reflective requirements, is quite high. Furthermore, such prisms are difficult to fabricate using batch processing techniques.

Figure 3:
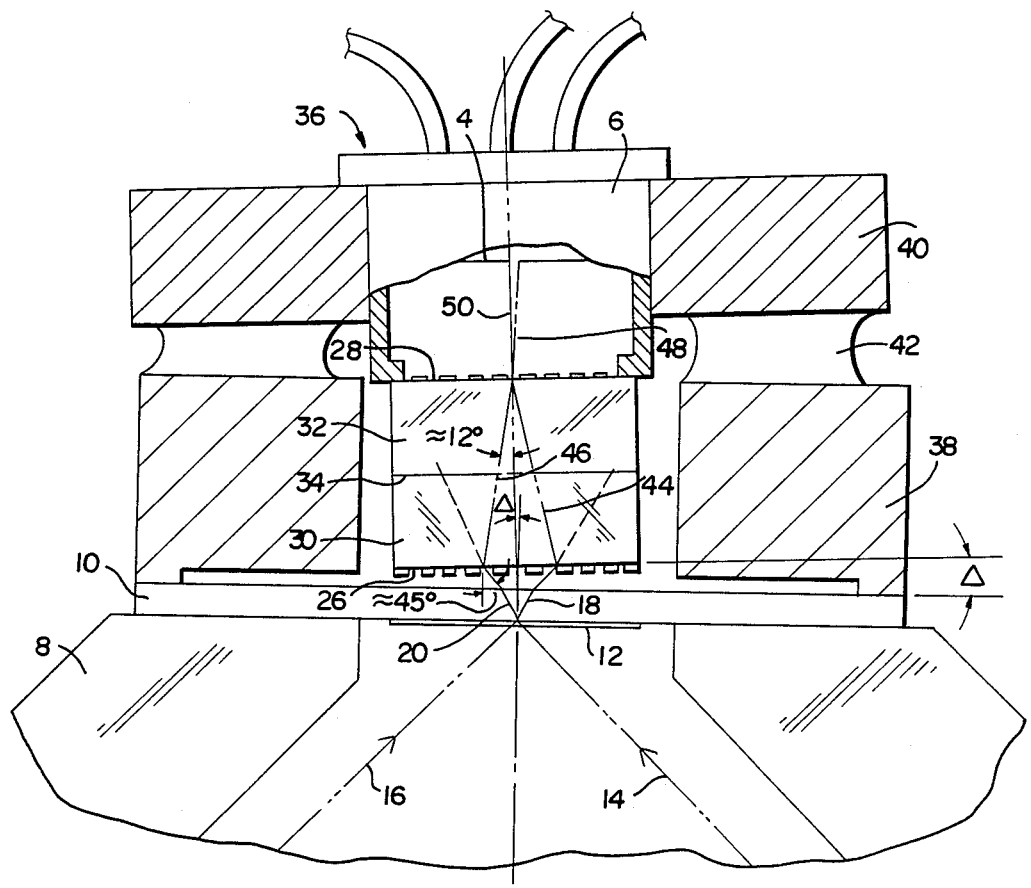
FIG. 3 is a cross-sectional view of the beam combiner assembly of the instant invention.

With reference to FIG. 3, there is shown a cross-sectional view of a first embodiment of the instant invention beam combiner assembly. Using the same numbers as FIGS. 1 and 2 when the items are deemed to be equivalent, it can be seen that the FIG. 3 assembly is also mounted onto gyro block 8 of a ring laser gyroscope. Similarly, an output mirror 10, with reflective coating 12, is mounted onto an apex of ring laser gyroscope block 8. For this embodiment, however, beams 14 and 16 are diffracted by a first diffraction grating 26 and a second diffraction grating 28. As shown, the respective light beams 18 and 20 leaking through output mirror coating 12 impinge on first diffraction grating 26, the fabrication of which is discussed in the article entitled "High-Frequency Holographic Transmission Gratings in Photoresist" by R. C. Enger and S. K. Case, *Journal of Optical Society of America*, Vol. 73, No. 9, Pages 1113 to 1118, September, 1983. Diffraction grating 28 is similarly fabricated.

The respective diffraction gratings are mounted onto corresponding, although not absolutely necessary, typically parallelepipedic light transmissive substrates 30 and 32, bonded adhesively at interface 34. Thus, diffraction gratings 26 and 28 are separated spatially by the light transmissive substrates and are situated at opposite surfaces of the bonded substrate block, which in turn is adhesively bonded to housing 6 of dual photodetector 4, with second diffraction grating 28 facing dual photodetector 4. The combination of diffraction gratings 26 and 28, light transmissive substrates 30 and 32, dual photodetector 4 and housing 6, for the sake of convenience, is referred to hereinafter as a unitary beam diffraction assembly 36.

To hold diffraction assembly 36 in place, for the FIG. 3 embodiment, there is mounted onto output mirror 10 a ring member 38. Superposed above ring member 38 is a second ring member 40, which has bonded to its inner circumference housing 6, and hence, diffraction assembly 36. Second ring member 40 in turn is fixedly coupled to ring member 38 by some adhesive means to form an adhesive joint 42. When hardened, adhesive joint 42 permanently fixes ring member 40 with respect to ring member 38; and, accordingly, diffraction assembly 36, is fixed relative to output mirror 10.

As disclosed in the afore-noted Enger, et al. article, different numbers of lines per unit length may be fabricated for different diffraction gratings. As disclosed in the publication entitled "Dielectric Surface - Relief Gratings with High Diffraction Efficiency" by Kiyoshi Yokomori, *Journal of Applied Optics*, Vol. 23, No. 14, pp. 2303 to 2310, July 15, 1984; and the article entitled "Diffraction Characteristic of Photoresist Surface-Relief Gratings" by M. G. Moharam, T. K. Gaylord, G. T. Sincerbox, H. Werlich, and B. Yung, *Journal of Applied Optics*, Vol. 23, No. 18, pp. 3214 to 3220, Sept. 15, 1984, diffraction gratings may be used to diverge or converge light beams.

Figure 4:
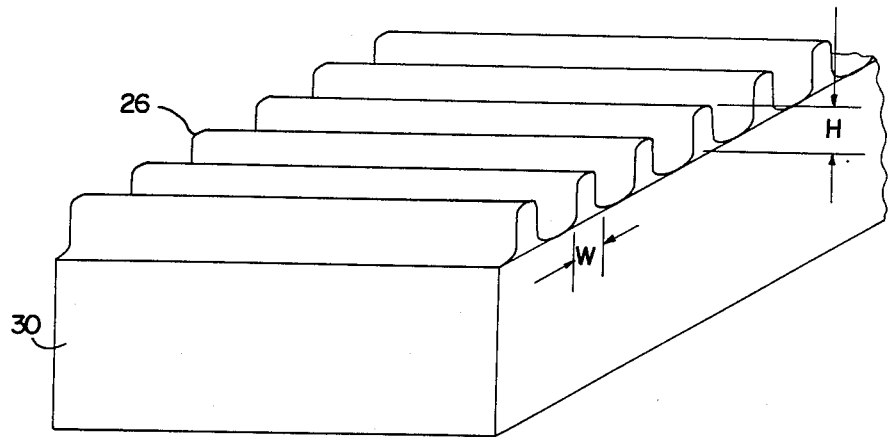
FIG. 4 is an enlarged perspective view of a portion of a diffraction grating of the FIG. 3 beam combiner assembly.

An example of a portion of such grating is shown in FIG. 4 wherein it should be noted that the height (H) of each ridge is greater than the width (W) thereof. Also, the gratings are typically fabricated and mounted onto the surface of a substrate material which has a low coefficient of thermal expansion, such as fused quartz. For the FIG. 3 embodiment, diffraction gratings 26 and 28 are oriented with their respective longitudinal lines perpendicular to the plane of the figure. The grating is characterized by the number of lines per unit length, for example, the number of lines per millimeter. By using fused quartz for substrates 30 and 32, the grating spacing will remain constant over a wide range of temperatures—a necessary condition for proper operation of a beam combiner assembly.

There are a number of reasons why there is a slight angle $\Delta$ offsetting first diffraction grating 26 from the plane of output mirror 10. The first reason is the possibility of increased lock-in of the gyro if a diffraction grating is positioned in parallel to the output mirror. In this case, a portion of the beams 18 and 20 are diffracted back into the cavity of gyro block 8, along the paths of light beams 16 and 14, respectively.

The second reason that an offset angle is needed is due to the fact that, in practice, in fabricating a diffraction grating, the exact number of lines per unit length can never be achieved. In other words, a tolerance for the desired number of lines per unit length is needed, due to the manufacturing process. Therefore, the effective number of lines per unit length has to be adjusted to reflect the desired number. This is accomplished by tilting such that the effective number of lines per unit length is the same as the desired number of lines per unit length. This can be better explained with reference to the operation of the FIG. 3 beam combiner assembly.

Referring to FIG. 3, it can be seen that beams 18 and 20 are diffracted by diffraction grating 26, in a convergent manner, as light beams 44 and 46, respectively. Beams 44 and 46 converge onto approximately the same point on the second diffraction grating 28 and are diffracted thereby, in a diverging (or converging) manner, toward photodetector 4. As was discussed previously, the separation which is needed between the light beams impinging onto photodetector 4 should be in the order of approximately 100 seconds of arc, in order to generate an interference fringe pattern to provide an output from the ring laser gyroscope. It should be appreciated that such a small angular separation requires an adjustment to compensate for variations of the thickness of substrates 30 and 32, the earlier discussed number of lines per unit length of the diffraction gratings and other factors.

To accomplish this end, the inventors have found that it is possible to tilt one or both of diffraction gratings 26 and 28 by an offset angle $\Delta$ such that the tolerance errors may be compensated. The degree of accuracy with which the offset angle $\Delta$ is selected is much smaller than the angular adjustment required in prior art prism combiners. By empirical studies and conventional formulae such as Snell's Law and diffraction grating equations, the $\Delta$ angle has been found to fall within 0.5 to 6 degrees, with 2.5 degrees being the optimal tilt, for the FIG. 3 embodiment. As was discussed previously, hardened adhesive joint 42 permanently fixes grating 26 with respect to the plane of output mirror 10 to attain angle $\Delta$.

Also, diffraction grating 26 for the FIG. 3 embodiment has approximately 1,500 lines per millimeter while diffraction grating 28 has only approximately one-third as many lines per millimeter. Accordingly, as shown in FIG. 3, the angle between light beam 20 and the normal to the first diffraction grating 26 is approximately 45 degrees while the angle between light beam 46 and the normal to diffraction grating 28 is only approximately 12 degrees. Of course, it should be appreciated that for different types of ring laser gyroscopes using gratings having different numbers of lines per unit length, the respective offset angles may be different.

Figure 5:
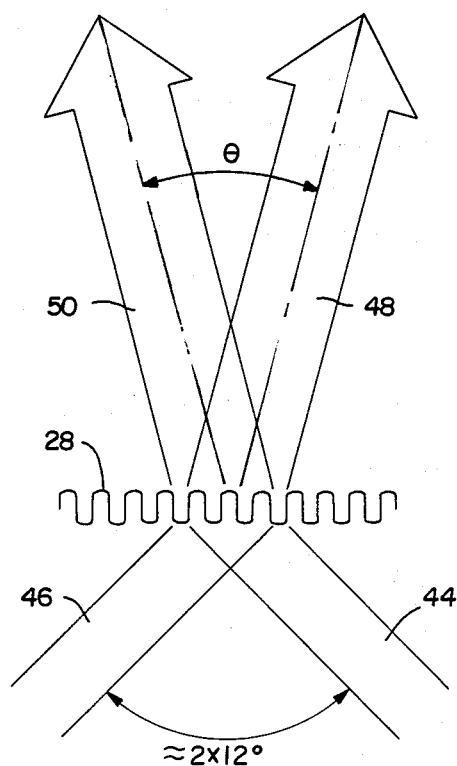
FIG. 5 is an enlarged view of the light beams being separated by the diffraction grating adjacent to the detector of the FIG. 3 beam combiner assembly.

FIG. 5 illustrates more clearly that beams 48 and 50, upon diffraction from beams 46 and 44, respectively, through diffraction grating 28, do have a separation of approximately 100 seconds of arc, designated as $\Theta$.

Figure 6:
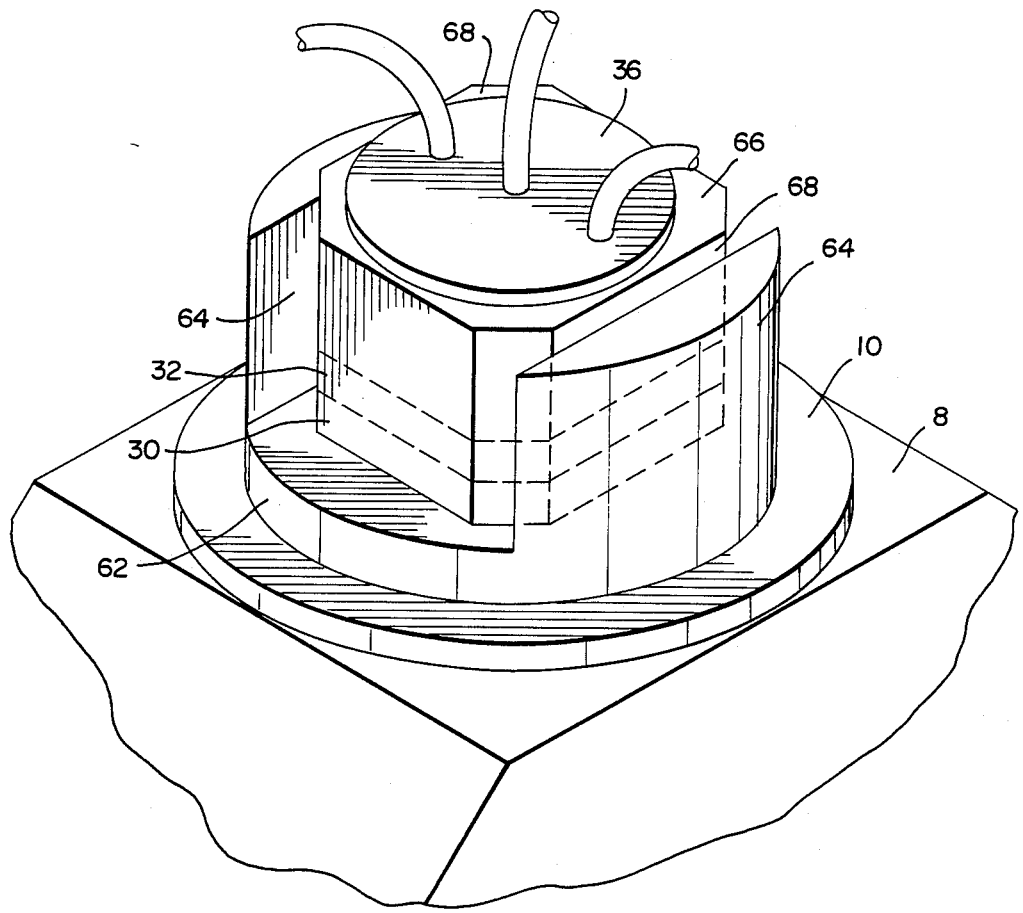
FIG. 6 is a perspective view of another embodiment of the present invention beam combiner assembly.

A second embodiment of the present invention beam combiner assembly is shown in FIG. 6. There, it can be seen that ring member 62 has at least two arms 64 extending therefrom. The diffraction assembly 36 is inserted into a housing 66, which subsequently is fixed to the inside surface of arms 64 by means of surfaces 68. As before, housing 66 may be tilted in such a way that an angle $\Delta$ is effected between diffraction assembly 36 and output mirror 10. The dotted lines on housing 66 represent the approximate placements of light transmissive substrates 30 and 32.

Although the diffraction gratings are shown to be mounted onto two separate substrates bonded together, it should be appreciated that in place of the two substrates, a single light transmissive substrate may be used, provided that the diffraction gratings may be fabricated on both surfaces of the single substrate. As for the diffraction gratings, it should be appreciated that inasmuch as a plurality of diffraction gratings may be batch fabricated from a single sheet such that each diffraction grating has the same number of lines per unit length, the cost of manufacturing a present invention beam combiner assembly is greatly reduced, at last estimate at approximately thirty-fold, from the conventional manufacturing process involved in fabricating a prism beam combiner. Furthermore, since the present invention beam combiner assembly is amenable to batch processed manufacturing, a less sensitive, in terms of angular adjustment, ring laser gyroscope may be effected.

Inasmuch as the present invention is subject to many variations, modification, and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. In a ring laser gyroscope having a cavity wherein laser beams circulate, respective portions of the laser beams being transmitted out of the cavity through an output mirror, a beam combiner assembly for directing the transmitted beams to a detecting means, the beam combiner assembly comprising:
   a first diffraction means for converging the transmitted beams;
   a second diffraction means positioned in spatial relationship to the first diffraction means for receiving the converging beams;
   wherein the first diffraction means is positioned at an angle offset from the plane of the output mirror for converging the refracted beams onto the second diffraction means at approximately the same point thereon; and
   wherein the converged beams are diverged slightly by the second diffraction means and directed towards the detecting means for providing therefor an interference fringe pattern.

2. The beam combiner assembly according to claim 1, further comprising:
   adhesive means for fixedly positioning the first diffraction means at the offset angle.

3. The beam combiner assembly according to claim 1, wherein the first and second diffraction means are diffraction gratings.

4. The beam combiner assembly according to claim 3, wherein the first diffraction grating has a greater number of lines per unit of length than the second diffraction grating.

5. The beam combiner assembly according to claim 3 wherein the first and second diffraction gratings are mounted onto respective light transmissive substrates at opposite surfaces thereof; and wherein the substrates are coupled together at their respective non-diffraction grating mounted surfaces.

6. The beam combiner assembly according to claim 5 wherein the coupled substrates are secured to the detecting means to form a unitary beam diffraction assembly, the second diffraction grating facing the detecting means.

7. The beam combiner assembly according to claim 6, further comprising upper and lower ring members, the lower ring member being fixedly mounted onto the output mirror for encircling the coupled substrates and the upper ring member being fixedly positioned at the offset angle to the lower ring member for providing an opening into which the unitary beam diffraction assembly is inserted, the beam diffraction assembly being fixedly bonded to the inner circumference of the upper ring member which defines the opening.

8. The beam combiner assembly according to claim 7, wherein the unitary beam diffraction assembly is inserted into the hole provided by inserted fixedly positioned ring members; and
   wherein the detecting means is securely fixed to the inside circumference of the upper ring member so as to provide the offset angle between the first diffraction grating and the plane of the output mirror.

9. The beam combiner assembly according to claim 7, wherein the lower ring member comprises at least two extensions and wherein the upper ring member comprises corresponding slots for accepting and coupling to the extensions.

10. The beam combiner assembly according to claim 1, wherein the offset angle is between 0.5 to 6 degrees.

11. The beam combiner assembly according to claim 1, further comprising:
 a ring member mounted onto the output mirror, the ring member having at least two arms extending away from the output mirror for fixedly embracing the first and second diffraction means.

12. The beam combiner assembly according to claim 11, wherein the first and second diffraction means are diffraction gratings.

13. The beam combiner assembly according to claim 12, wherein the first diffraction grating has a greater number of lines per unit length than the second diffraction grating.

14. The beam combiner assembly according to claim 12, wherein the first and second diffraction gratings are mounted onto opposite surfaces of respective light transmissive substrates, the substrates being coupled together, the second diffraction grating facing the detecting means, the coupled substrates being secured to the detecting means to form a unitary beam diffraction assembly.

15. The beam combiner assembly according to claim 14, wherein the two extending arms have respective opposing inside surfaces and wherein the beam diffraction assembly is securely coupled to the inside surfaces, the first diffraction grating of the beam diffraction assembly being fixed relative to the plane of the output mirror at the offset angle.

16. In a ring-laser gyroscope having a cavity wherein laser beams circulate, respective portions of the laser beams being transmitted out of the cavity through an output mirror, a method of directing the transmitted beams to a detecting means, comprising the steps of:
 using a first diffraction grating to converge the diffracted beams;
 positioning a second diffraction grating in a spatial relationship to the first diffraction grating;
 offsetting the first diffraction grating at an angle from the plane of the output mirror for converging the refracted beams onto the second diffraction grating at approximately the same point thereon; and
 utilizing the second diffraction grating to diverge the converged beams slightly so that the diverged beams, when impinged onto the detecting means, provide an interference fringe pattern therefor.

17. The method according to claim 16, further comprising the steps of:
 mounting the first diffraction grating onto a surface of a first light transmissive block;
 mounting the second diffraction grating onto a surface of a second light transmissive block;
 coupling the first and second light transmissive blocks such that the first and second diffraction gratings are positioned in spatial relationship at opposite surfaces of the coupled light transmissive blocks; and
 attaching the coupled blocks to the detecting means to form a unitary beam diffraction assembly, the second diffraction grating being positioned to face the detecting means.

18. The method according to claim 17, further comprising:
 mounting a first ring member onto the output mirror;
 mounting a second ring member at the offset angle to the first ring member;
 inserting the unitary beam diffractive assembly into the hole provided by the fixedly positioned ring members; and
 securely fixing the unitary beam diffraction assembly to the inside circumference of the second ring member, thereby providing the offset angle between the first diffraction grating and the plane of the output mirror.

19. The method according to claim 17, further comprising the steps of:
 mounting a ring member onto the output mirror, the ring member having at least two arms extending away from the output mirror; and
 attaching the unitary beam diffraction assembly to the inside surfaces of the extended arms such that the first diffraction grating is positioned relative to the plane of output mirror at the offset angle.

20. The method according to claim 16, wherein the offsetting step comprises the step of:
 adjusting the offset angle between 0.5 and 6 degrees.

* * * * *